United States Patent [19]

Negishi

[11] Patent Number: 4,700,093
[45] Date of Patent: Oct. 13, 1987

[54] CORROSION-RESISTANT MOTOR CASING

[75] Inventor: Yoshio Negishi, Saitama, Japan

[73] Assignee: Kabushiki Kaisha Showa Seisakusho, Tokyo, Japan

[21] Appl. No.: 792,683

[22] Filed: Oct. 29, 1985

[30] Foreign Application Priority Data

Oct. 29, 1984 [JP] Japan .................. 59-163473[U]

[51] Int. Cl.$^4$ .............................................. H02K 5/00
[52] U.S. Cl. ........................................ 310/89; 310/42; 310/254
[58] Field of Search ............... 310/42, 45, 89, 88, 310/254, 90

[56] References Cited

U.S. PATENT DOCUMENTS

| 2,667,591 | 1/1954 | Gindroz | 310/45 X |
| 3,200,275 | 8/1965 | Lindgren | 310/90 |
| 3,289,018 | 11/1966 | Schaefer | 310/42 |
| 3,527,969 | 9/1970 | Papst | 310/89 X |
| 3,555,320 | 1/1971 | Johnson | 310/89 |
| 3,638,055 | 1/1972 | Zimmerman | 310/89 X |
| 4,210,832 | 7/1980 | Ascoli | 310/89 X |
| 4,233,535 | 11/1980 | Barone | 310/89 X |
| 4,528,473 | 7/1985 | Tezuka | 310/89 |

Primary Examiner—Donovan F. Duggan
Attorney, Agent, or Firm—Lowe, Price, LeBlanc, Becker & Shur

[57] ABSTRACT

A corrosion-resistant electric motor casing comprises a substantially cylindrical yoke and barrel, and a pair of brackets fixed to and closing the axially opposite ends of the yoke and barrel. The yoke and barrel comprises a first member substantially in the form of a hollow cylinder made of a material which is sufficiently ferromagnetic to serve as a motor yoke, and a second member in the form of a pipe of aluminmum fitted over the first member and covering the outer peripheral surface thereof. The motor casing is made highly resistant to corrosion without involving an increase in the weight and cost thereof.

12 Claims, 3 Drawing Figures

CORROSION-RESISTANT MOTOR CASING

BACKGROUND OF THE INVENTION

The present invention relates to an electric motor, and more particularly to an electric motor casing.

Most motors have a field magnet on the stator, the field magnet comprising a plurality of field poles each having an iron core with a coil wound thereon and a yoke connecting the field poles to form a magnetic circuit. The yoke is made of a material selected primarily with a view to achieving required magnetic characteristics. Examples of yoke materials are cast iron, cast steel, silicon steel, and the like. Since these materials are iron-base metals and the yoke is required to have a certain volume, the yoke is heavy and normally responsible for most of the entire weight of the motor. Inasmuch as the yoke is highly sturdy in construction, it is generally employed as a motor casing or as a major portion of the motor casing.

Where a motor having such a yoke and casing is used on a ship or in other marine use, provision should be made for rendering the casing resistant to corrosion since the yoke materials as described above are highly susceptible to corrosion. It has been cutomary to coat the surface of the yoke and casing with a plated layer, a paint layer, a chemically deposited layer, or the like, or to make the yoke and casing of stainless steel that is highly corrosion-resistant.

The corrosion resistance of the yoke and casing with the surface layer deposited thereon can however be lost easily by physical contact particularly with a hard object having a sharp edge. The yoke and casing of stainless steel is disadvantageous in that since the stainless steel is not sufficiently ferromagnetic, the volume of the yoke should be so large as to ensure desired yoke performance, resulting in an increase in the weight and cost of the motor.

SUMMARY OF THE INVENTION

The present invention has been made in an effort to eliminate the aforesaid drawbacks of the conventional motor casings.

It is an object of the present invention to provide a corrosion-resistant motor casing with its corrosion resistance protected against being impaired by physical contact with a foreign object, the motor casing involving no increase in the cost and weight thereof.

The above object can be accomplished by a corrosion-resistant electric motor casing comprising a substantially cylindrical yoke and barrel, and a pair of brackets fixed to and closing the axially opposite ends of the yoke and barrel. The yoke and barrel comprises a first member substantially in the form of a hollow cylinder made of a material which is sufficiently ferromagnetic to serve as a motor yoke, and a second member in the form of a pipe of aluninmum fitted over the first member and covering the outer peripheral surface thereof.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
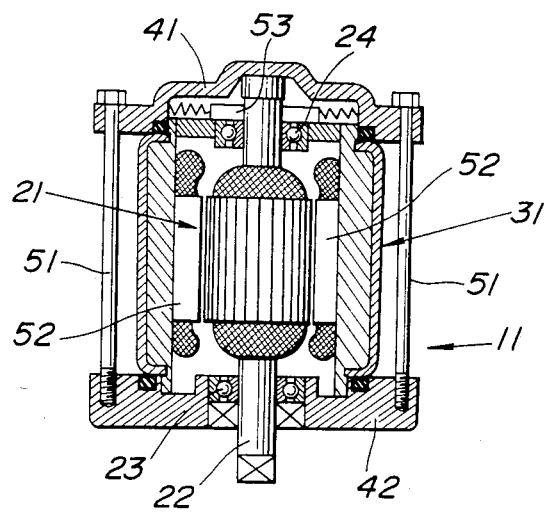
FIG. 1 is a cross-sectional view of an electric motor incorporating a corrosion-resistant motor casing according to the present invention.

FIG. 1 schematically illustrates the overall construction of an electric motor. The illustrated motor has its axis extending in the vertical direction. For an easier understanding of the present invention, the terms "upper" and "lower" are used hereinbelow with reference to the vertical orientation of FIGS. 1 through 3.

The motor generally has a casing 11 and a rotor 21 rotatably disposed in the casing 11. The casing 11 comprises a cylindrical yoke and barrel 31 (hereinafter referred to as a "barrel 31"), and upper and lower brackets 41, 42 of aluminum which close the upper and lower ends, respectively, of the barrel 31. The barrel 31 and the upper and lower brackets 41, 42 are clamped and fastened together by means of through bolts 51 interconnecting the upper and lower brackets 41, 42. The rotor 21 has a shaft 22 rotatably supported at its lower portion by a bearing 23 on the lower bracket 42 and at its upper portion by a bearing 24 on the upper end of the barrel 31. The casing 11 also accommodates therein field poles 52 attached to the inner surface of the barrel 31 and brushes 53 disposed in the upper bracket 41.

Figure 2:
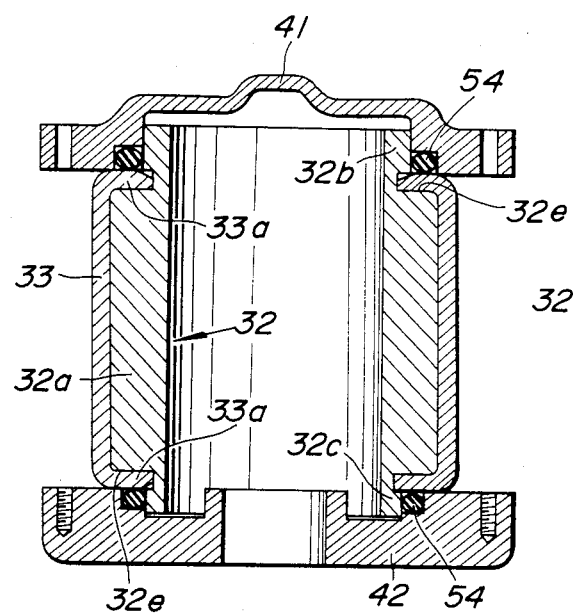
FIG. 2 is an enlarged cross-sectional view of the motor casing shown in FIG. 1.
Figure 3:
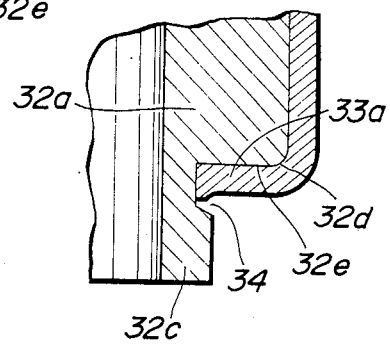
FIG. 3 is an enlarged fragmentary cross-sectional view of the motor casing of FIGS. 1 and 2, the view showing a sleeve and a ring groove thereof.

The motor casing 11 will be described in greater detail with reference to FIG. 2. The barrel 31 comprises a first member 32 made of a material, such as cast iron, cast steel, silicon steel, or the like, which is suitable to provide magnetic characteristics required of the yoke, and a second member 33 made of a highly corrosion-resistant material, the first member 32 being referred to as a "yoke". The second member 33 is in the form of an aluminum pipe and will be referred to as a "pipe". The yoke 32 has a body 32a in the form of a hollow cylinder having a relatively large wall thickness. The body 32a has thinner upper and lower sleeves 32b, 32c at its upper end lower ends, respectively. The body 32a has a substantially circular cross-sectional shape across the axis thereof and includes a round shoulder 32d (FIG. 3) at each of its upper and lower end portions. Each of the upper and lower sleeves 32b, 32c has an annular groove 34 defined in its portion joined to an end of the body 32a and having a wall surface lying flush with an end surface 32e of the body 32a. The aluminum pipe 33 is fitted over the body 32a to cover the outer peripheral surface thereof and has upper and lower end portions bent radially inwardly into upper and lower flanges 33a, respectively, held closely against the upper and lower end surfaces 32e of the body 32a. The aluminum pipe 33 can be formed from a pipe blank in the form of a plain hollow cylinder having no flange. After the pipe blank is fitted over the yoke 32, the upper and lower end portions are plastically deformed into the flanges 33a. Since the end portions of the pipe blank are bent radially inwardly, the diameter of the pipe blank at the end portions is reduced, and as a result, the length (in the axial direction) of the end portions before they are bent is different from the length (in the radial direction) of the end portions after they are bent, or the width of the bent flanges, the latter length being larger than the former length. Stated otherwise, the end portions of the pipe blank as they are bent are elongated radially. The amount of elongation arising from plastic deformation is generally subject to irregularities. The annular grooves 34 of the yoke 32 are so sized that such irregular elongation of the bent end portions of the pipe 33 will not adversely affect the sealing capability between the barrel 31 and the brackets 41, 42 as described later. More specifically, the grooves 34 have such a volume that even if the amount of elongation of the bent end portions of the pipe is smallest possible, the radially inner edges of the flanges 33a remain held against the bottoms of the grooves 34, and if the amount of elongation of the bent end portions of the pipe is largest possible, the radially inner edges of the flanges 33a will not overflow the grooves 34 to guard against damage to upper and lower O-rings 54. Therefore, any elongation irregularities can be absorbed by the grooves 34. As shown in FIG. 2, the upper bracket 41 is fitted over the upper sleeve 32b of the yoke 32, and the upper O-ring 54 provides a complete fluid seal between the upper bracket 41 and the upper surface of the upper flange 33a of the pipe 33. Similarly, the lower bracket 42 is fitted over the lower sleeve 32c of the yoke 32 with the lower O-ring 54 between the lower bracket 42 and the lower flange 33a of the pipe 33.

Since the yoke 32 is substantially circular in cross section and the shoulders 32d thereof are round, the pipe 33 can easily be plastically deformed, and the flanges 33a are prevented from being wrinkled on their outer surfaces at the time they are deformed, with the result that the casing 11 has an improved sealing capability. The aluminum which the pipe 33 is made of is highly resistant to corrosion and deformation, and is available at a low cost.

The upper and lower brackets 41, 42 and the pipe 33 are all made of aluminum as described above. Therefore, these brackets and pipe are not subject to any electrofusion which would otherwise result from different ionization tendencies if the brackets and the pipe were made of different metals.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A corrosion-resistant electric motor casing comprising:
    a substantially cylindrical yoke and barrel;
    a pair of brackets fixed to and closing the axially opposite ends of said yoke and barrel; and
    said yoke and barrel comprising a first member substantially in the form of a hollow cylinder made of a material which is sufficiently ferromagnetic to serve as a motor yoke, and a second member in the form of a tubular pipe of aluminum fitted over said first member and covering the outer peripheral surface thereof,
    wherein said first member has a cylindrical body having on opposite ends thereof a pair of sleeves over which said brackets are fitted, respectively, said ends of said second member arranged to be plastically deformed when being fitted over said first member thereby to form respective flanges on opposite ends thereof, said first member having annular grooves defined around portions of said sleeves which are joined to end surfaces of said cylindrical body, said flanges having edges respectively received in said grooves.

2. A corrosion-resistant electric motor casing according to claim 1, wherein said annular grooves have such a volume as to accommodate the amount of elongation of said flanges at the time the flanges are formed by plastic deformation.

3. A corrosion-resistant electric motor casing according to claim 2, including an O-ring disposed as a seal between each of said flanges and a corresponding one of said brackets.

4. A corrosion-resistant electric motor casing according to claim 3, wherein said cylindrical body is substantially circular in cross section across the axis thereof, and has round shoulders.

5. A corrosion-resistant electric motor casing according to claim 1, wherein each of said brackets is made of aluminum.

6. In an electric motor casing including a cylindrical ferromagnetic casing member forming a yoke and barrel and a pair of brackets fixed to and closing axially opposite ends of said cylindrical ferromagnetic casing member, the improvement comprising:
    structural corrosion-resisting means structured as an outer cover for said electric motor casing, said corrosion-resisting means formed of a corrosion-resisting material,
    said corrosion-resisting means comprising substantially cylindrical tube means externally mounted in fitted relationship over said cylindrical ferromagnetic casing member,
    wherein said cylindrical ferromagnetic casing member comprises oppositely disposed annular grooves around opposite end surfaces thereof and
    said cylindrical tube means comprises radially bent end portions forming a pair of flanges for respectively engaging said oppositely disposed annular grooves of said cylindrical ferromagnetic casing member,
    thereby providing engaging means for axially engaging said cylindrical tube means to said cylindrical ferromagnetic casing member to prevent axial displacement therebetween.

7. An improved electric motor casing as recited in claim 6 wherein said cylindrical ferromagnetic casing member further comprises oppositely disposed sleeve members thinner than a main yoke portion thereof, said sleeve members provided at opposing ends of said cylindrical ferromagnetic casing member and said annular grooves provided between said thinner sleeves and said thicker yoke portion,
    further comprising a pair of end brackets mounted to and closing said opposing ends of said cylindrical ferromagnetic casing member,
    said flanges of said cylindrical tube means respectively mounted between said thicker yoke portion of said cylindrical ferromagnetic casing member and respective end brackets.

8. An improved electric motor casing as recited in claim 7 further comprising means for maintaining a fluid seal between said end brackets and the respective flanges mounted thereto.

9. An improved electric motor casing as recited in claim 8 wherein said fluid seal maintaining means comprises an O-ring.

10. An improved electric motor casing as recited in claim 7 wherein said end brackets are formed of aluminum.

11. An improved electric motor casing as recited in claim 10 wherein said cylindrical tube means is formed of aluminum.

12. In an electric motor casing including a cylindrical ferromagnetic casing member forming a yoke and barrel and a pair of brackets fixed to and closing axially opposite ends of said cylindrical ferromagnetic casing member, the improvement comprising:

structural corrosion-resisting means structured as an outer cover for said electric motor casing, said corrosion-resisting means formed of a corrosion-resisting material, said corrosion-resisting means comprising substantially cylindrical tube means externally mounted in fitted relationship over said cylindrical ferromagnetic casing member wherein said cylindrical ferromagnetic casing member comprises oppositely disposed annular grooves around opposite end surfaces thereof and said cylindrical tube means comprises radially bent end portions forming a pair of flanges for respectively engaging said oppositely disposed annular grooves of said cylindrical ferromagnetic casing member, thereby providing engaging means for axially engaging said cylindrical tube means to said cylindrical ferromagnetic casing member to prevent axial displacement therebetween, and wherein said cylindrical tube means is formed of aluminum.

* * * * *